(12) United States Patent
Chen (10) Patent No.: US 9,035,666 B2
(45) Date of Patent: May 19, 2015

(54) TORSION ANGLE AND ROTATION ANGLE MEASUREMENT DEVICE

(76) Inventor: Chieh Chi Chen, Taipei (TW)

( * ) Notice: Subject to any disclaimer, the term of this patent is extended or adjusted under 35 U.S.C. 154(b) by 811 days.

(21) Appl. No.: 13/338,544

(22) Filed: Dec. 28, 2011

(65) Prior Publication Data

US 2012/0306514 A1 Dec. 6, 2012

(30) Foreign Application Priority Data

Jun. 3, 2011 (CN) .......................... 2011 1 0153655

(51) Int. Cl.
| | |
|---|---|
| G01R 27/08 | (2006.01) |
| G01B 7/30 | (2006.01) |
| G01P 3/44 | (2006.01) |
| G01B 7/16 | (2006.01) |

(52) U.S. Cl.
CPC . *G01B 7/30* (2013.01); *G01P 3/443* (2013.01); *G01P 3/44* (2013.01); *G01B 7/16* (2013.01)

(58) Field of Classification Search
CPC ...... G01B 7/003; G01D 5/2013; G01P 13/04; B62D 15/021
USPC ............. 324/693, 207.11, 207.25; 360/73.03
See application file for complete search history.

(56) References Cited

U.S. PATENT DOCUMENTS

| | | | | |
|---|---|---|---|---|
| 5,511,320 | A | * | 4/1996 | Heidel et al. ................ 33/366.13 |
| 5,547,383 | A | * | 8/1996 | Yamaguchi ..................... 434/62 |
| 2008/0309324 | A1 | * | 12/2008 | Stuve et al. ................ 324/207.2 |
| 2011/0061962 | A1 | | 3/2011 | Sy |

FOREIGN PATENT DOCUMENTS

| | | |
|---|---|---|
| CN | 101458063 A | 6/2009 |
| CN | 201283892 Y | 8/2009 |
| JP | 2004-239799 A | 8/2004 |

* cited by examiner

*Primary Examiner* — Jermele M Hollington
*Assistant Examiner* — Giovanni Astacio-Oquendo
(74) *Attorney, Agent, or Firm* — Bui Garcia-Zamor; Jessica H. Bui, Esq.

(57) ABSTRACT

A torsion angle and rotation angle measurement device includes an input rotation disk, an output rotation disk, at least two torsion measuring modules and a rotation measuring module. The output rotation disk is coaxially and rotatably connected with the input rotation disk. At least two torsion measuring modules are disposed between the input rotation disk and the output rotation disk. Each torsion measuring module includes a rotary variable resistor and a torsion measuring arm. The rotary variable resistor is disposed on the output rotation disk. The torsion measuring arm is pivotally connected with the rotary variable resistor at a first end thereof, and is slidably connected with the input rotation disk at an second opposite end. When the input rotation disk rotates relative to the output rotation disk, the rotary variable resistor measures an angle indicating the input rotation disk rotating relative to the output rotation disk.

10 Claims, 8 Drawing Sheets

TORSION ANGLE AND ROTATION ANGLE MEASUREMENT DEVICE

RELATED APPLICATIONS

This application claims priority to China Application Serial Number 201110153655.9, filed Jun. 3, 2011, which is herein incorporated by reference.

BACKGROUND

1. Field of Invention

The present invention relates to a torsion angle and rotation angle measurement device. More particularly, the present invention relates to a torsion angle and rotation angle measurement device in a power steering wheel.

2. Description of Related Art

A torsion angle and rotation angle measurement device is designed in a conventional power steering wheel. A rotation measuring module of the torsion angle and rotation angle measurement device is usually equipped with two variable resistors installed on one single side of a printed circuit board. Each variable resistor serves as a fail-safe on behalf for the other one. The two variable resistors design provides a fail-safe guarantee, but needs a larger space for being installed, thus increasing the size of the torsion angle and rotation angle measurement device.

In addition, a conventional torsion angle and rotation angle measurement device often includes a rotary variable resistor, which is coaxially connected with its input rotation disk or output rotation disk. When a precise measurement is needed, a longer variable resistor is printed on a printed circuit board within the angle measurement device. Thus, a larger size of printed circuit board is needed for printing the longer variable resistor thereon. With this regard, the printed circuit board will cost more and the angle measurement device will be bigger.

For the forgoing reasons, there is a need for providing an improved torsion angle and rotation angle measurement device.

SUMMARY

It is therefore an objective of the present invention to provide an improved torsion angle and rotation angle measurement device to deal with the problems discussed in "description of related art".

In accordance with the foregoing and other objectives of the present invention, a torsion angle and rotation angle measurement device includes an input rotation disk, an output rotation disk, at least two torsion measuring modules and a rotation measuring module. The input rotation disk is connected with an input rotation driving source. The output rotation disk is connected with an output rotation target, and is coaxially and rotatably connected with the input rotation disk, wherein the output rotation disk has a first gear wheel. At least two torsion measuring modules are disposed between the input rotation disk and the output rotation disk. Each torsion measuring module includes a rotary variable resistor and a torsion measuring arm. The rotary variable resistor is disposed on the output rotation disk. The torsion measuring arm is pivotally connected with the rotary variable resistor at a first end thereof, and is slidably connected with the input rotation disk at a second opposite end thereof. When the input rotation disk rotates relative to the output rotation disk, the rotary variable resistor measures an angle indicating the input rotation disk rotating relative to the output rotation disk. The rotation measuring module includes a printed circuit board, two rotary variable resistors and a gear wheel set. The two rotary variable resistors are coaxially disposed on two opposite sides of the printed circuit board. The gear wheel set is meshed with the first gear wheel and coaxially drives the two rotary variable resistors simultaneously. When the output rotation disk rotates, the two rotary variable resistors measure a rotation angle of the output rotation disk.

In another embodiment disclosed herein, the input rotation disk has a linear slot for the torsion measuring arm to slide therewithin.

In another embodiment disclosed herein, the measurement device further includes a first housing and a second housing, wherein the first housing and the second housing are assembled to enclose the input rotation disk, the output rotation disk, the at least two torsion measuring modules and the rotation measuring module.

In another embodiment disclosed herein, the measurement device further includes a positioning pin to align the input rotation disk with the output rotation disk, wherein the positioning pin is inserted into respective positioning holes of the input rotation disk and the output rotation disk at a first end thereof, and is connected with the first housing or the second housing at a second opposite end thereof.

In another embodiment disclosed herein, the gear wheel set includes a second gear wheel, a third gear wheel and a fourth gear wheel, wherein the second gear wheel is meshed with the first gear wheel, and the third gear wheel is coaxially connected with the second gear wheel and rotates simultaneously, and the third gear wheel is meshed with the fourth gear wheel, and the fourth gear wheel coaxially drives the two rotary variable resistors.

In accordance with the foregoing and other objectives of the present invention, a torsion angle and rotation angle measurement device includes an input rotation disk, an output rotation disk, at least two torsion measuring modules and a rotation measuring module. The output rotation disk is connected with an output rotation target, and is coaxially and rotatably connected with the input rotation disk, wherein the output rotation disk has a first gear wheel. At least two torsion measuring modules are disposed between the input rotation disk and the output rotation disk. Each torsion measuring module includes at least one linear variable resistor, and the linear variable resistor is disposed on the output rotation disk and has a sliding arm connected with the input rotation disk. When the input rotation disk rotates relative to the output rotation disk, the linear variable resistor measures an angle indicating the input rotation disk rotating relative to the output rotation disk. The rotation measuring module includes a printed circuit board, two rotary variable resistors and a gear wheel set. The two rotary variable resistors are coaxially disposed on two opposite sides of the printed circuit board. The gear wheel set is meshed with the first gear wheel and coaxially drives the two rotary variable resistors simultaneously. When the output rotation disk rotates, the two rotary variable resistors measure a rotation angle of the output rotation disk.

In another embodiment disclosed herein, the input rotation disk has a linear slot for the sliding arm to slide therewithin.

In another embodiment disclosed herein, the measurement device further includes a first housing and a second housing, wherein the first housing and the second housing are assembled to enclose the input rotation disk, the output rotation disk, the at least two torsion measuring modules and the rotation measuring module.

In another embodiment disclosed herein, the measurement device further includes a positioning pin to align the input rotation disk with the output rotation disk, wherein the positioning pin is inserted into respective positioning holes of the input rotation disk and the output rotation disk at a first end thereof, and is connected with the first housing or the second housing at a second opposite end thereof.

In another embodiment disclosed herein, the gear wheel set includes a second gear wheel, a third gear wheel and a fourth gear wheel, wherein the second gear wheel is meshed with the first gear wheel, and the third gear wheel is coaxially connected with the second gear wheel and rotates simultaneously with the second gear wheel, and the third gear wheel is meshed with the fourth gear wheel, and the fourth gear wheel coaxially drives the two rotary variable resistors.

Thus, the torsion angle and rotation angle measurement device improves vibration interference along a radial direction of the input rotation disk in measuring the torsion angle, and measures a correct torsion angle. In addition, the rotation measuring module has its two rotary variable resistors coaxially installed on two opposite sides of the printed circuit board so as to reduce the size of the printed circuit board needed to install two rotary variable resistors thereon. Therefore, the torsion angle and rotation angle measurement device's size can be more compact and be used in a smaller application environment.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts.

Figure 1:
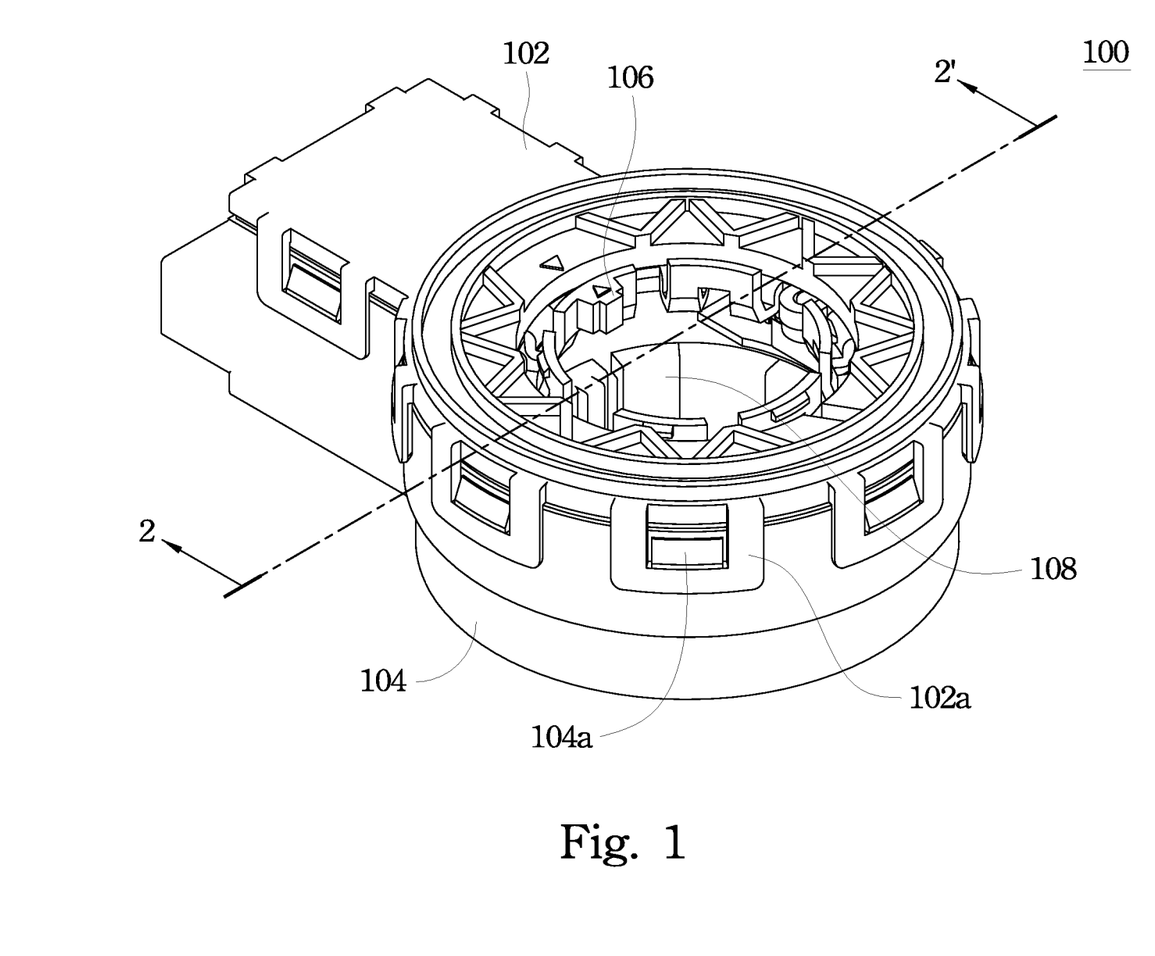
FIG. 1 illustrates a torsion angle and rotation angle measurement device according to an embodiment of this invention.
Figure 2:
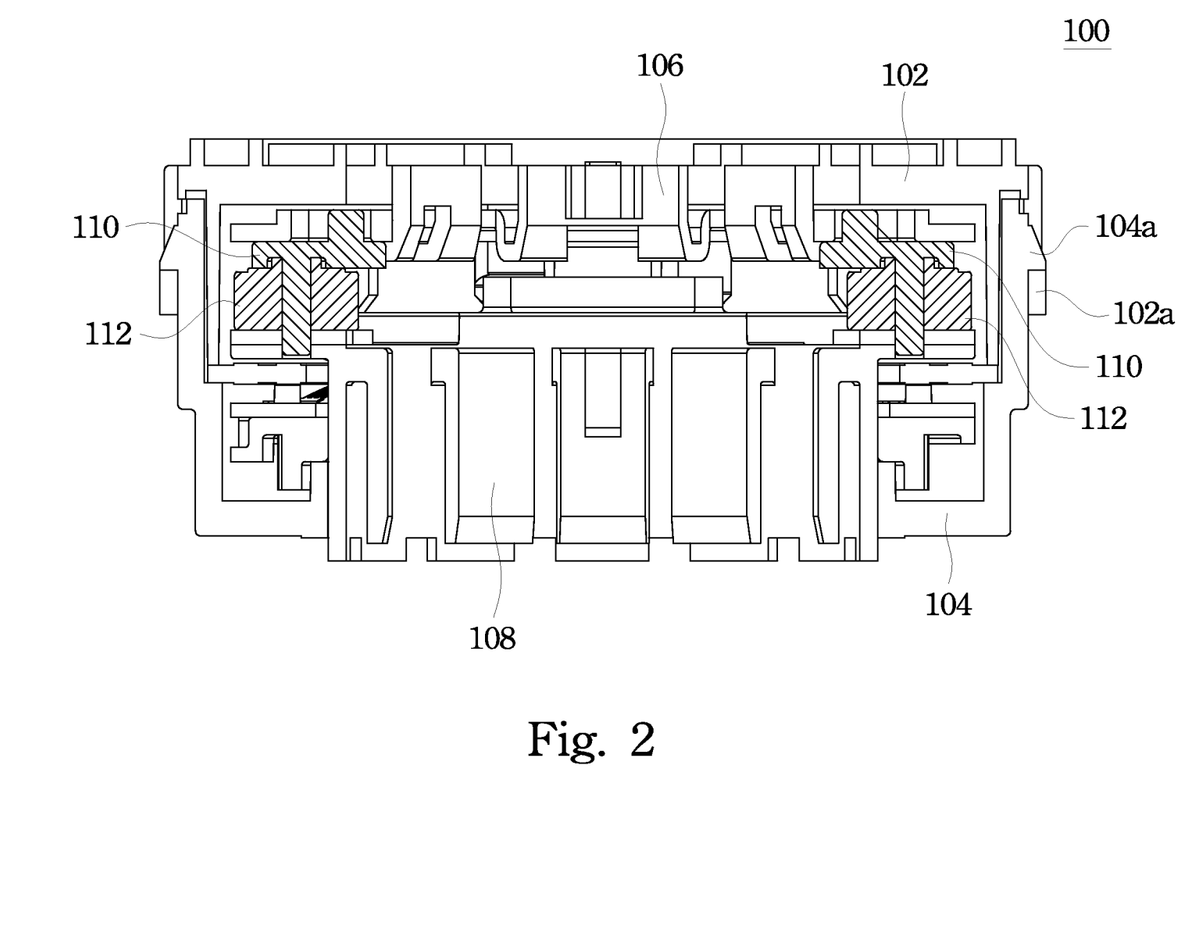
FIG. 2 illustrates a cross-sectional view taken along a cross-section line 2-2' in FIG. 1.

FIG. 1 illustrates a torsion angle and rotation angle measurement device according to an embodiment of this invention, and FIG. 2 illustrates a cross-sectional view taken along a cross-section line 2-2' in FIG. 1. A torsion angle and rotation angle measurement device 100 can be installed in a power steering of a car or other transport vehicles, but is not limited to the above applications. The torsion angle and rotation angle measurement device 100 includes at least one first housing 102, a second housing 104, an input rotation disk 106 and an output rotation disk 108. The input rotation disk 106 is used to be connected with an input rotation driving source, e.g., a steering wheel. The output rotation disk 108 is used to be connected with an output rotation target, e.g., a mechanism for controlling wheels of a vehicle. The torsion angle and rotation angle measurement device 100 is used to measure an angle (or an torsion angle) indicating the input rotation disk 106 rotating relative to the output rotation disk 108. The input rotation disk 106 is coaxially connected with the output rotation disk 108. In a status that a power steering action does not involve, the input rotation disk 106 and the output rotation disk 108 rotates simultaneously along with the input rotation driving source, and no torsion angle exists to trigger the power steering action. When the input rotation driving source is larger, an torsion angle exists between the input rotation disk 106 and the output rotation disk 108 to trigger the power steering action, and a rotary variable resistor 112 measures an angle indicating the input rotation disk 106 rotating relative to the output rotation disk 108. When the first housing 102 and the second housing 104 are assembled by means of fasteners 102a and fasteners 104a, the input rotation disk 106, the output rotation disk 108, the torsion measuring module and the rotation measuring module are all enclosed between two housings.

Figure 3:
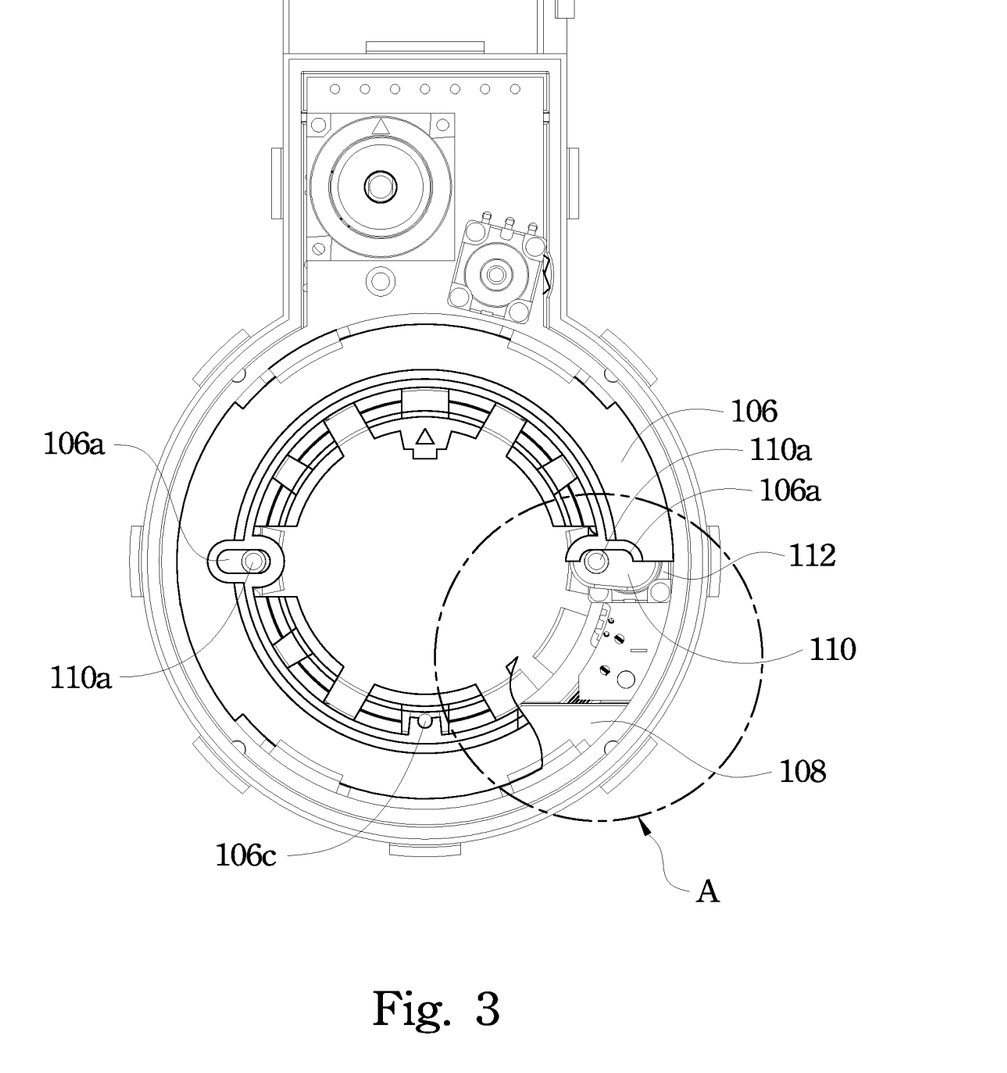
FIG. 3 illustrates a top view of the torsion angle and rotation angle measurement device in FIG. 1 with its first housing removed.

Referring to FIG. 3, which illustrates a top view of the torsion angle and rotation angle measurement device in FIG. 1 with its first housing removed. To clearly illustrate the rotary variable resistor 112 and the torsion measuring arm 110, a section A of the input rotation disk 106 is also removed. Referring to FIG. 2 and FIG. 3, two rotary variable resistors 112 are installed on the output rotation disk 108. When the two rotary variable resistors 112 operate, only one of the two rotary variable resistors 112 outputs its measured value to trigger the power steering action, and either one of the two rotary variable resistors 112 serves as a fail-safe on behalf for the other one. The input rotation disk 106 includes a linear slot 106a for a torsion measuring arm 110 to slide therewithin. This mechanism converts a rotation angle of the input rotation disk 106 into a rotation angle of the torsion measuring arm 110. Because the torsion measuring arm 110 has a smaller rotation radius than the input rotation disk 106 has, the torsion measuring arm 110 rotates greater than the input rotation disk 106 does, and thus the rotary variable resistor 112 can measure a larger and correct torsion angle. In addition, this design reduces vibration interference along a radial direction of the input rotation disk 106 in measuring the torsion angle.

Figure 4:
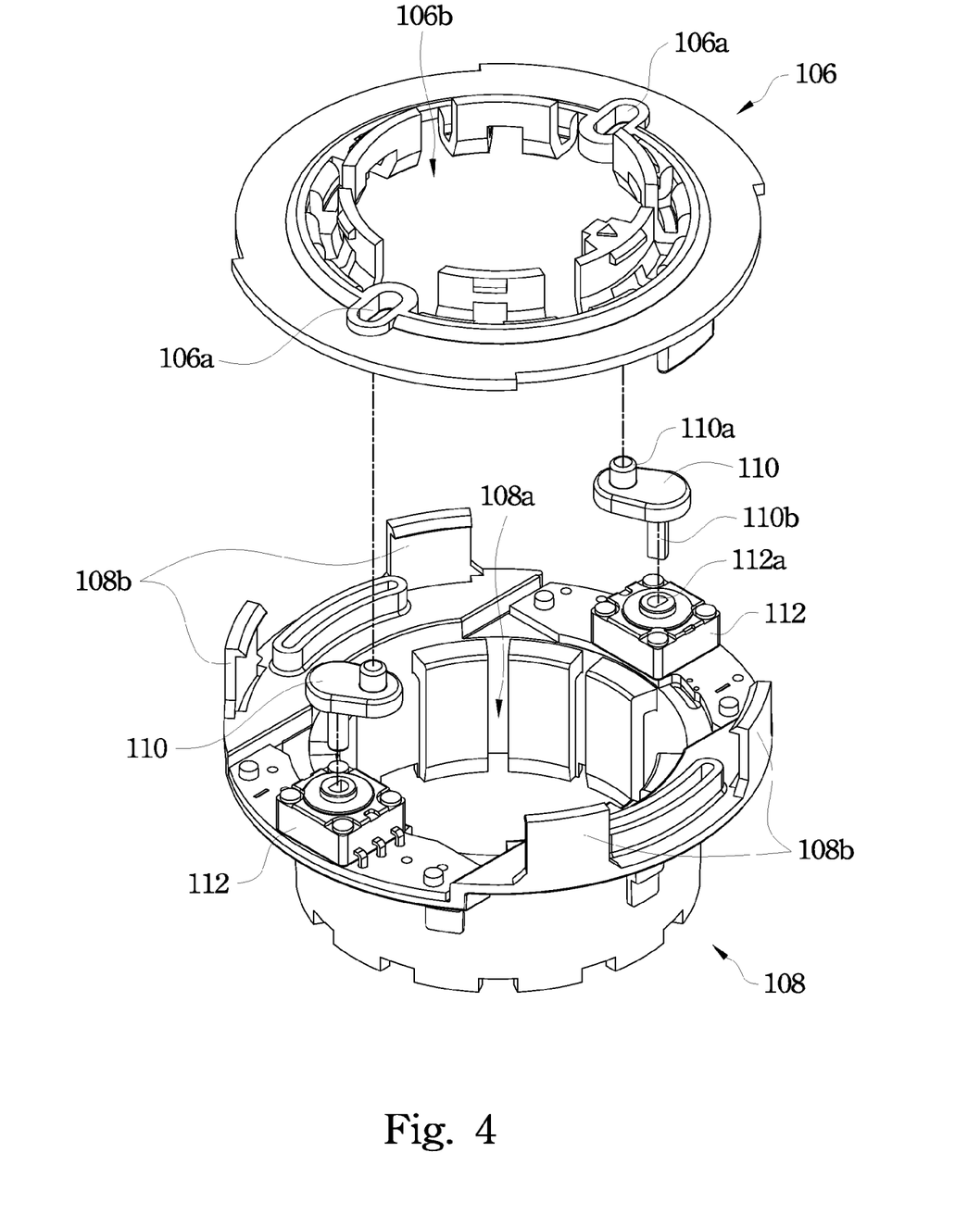
FIG. 4 illustrates an exploded view of an input rotation disk and an output rotation disk in FIG. 1.

FIG. 4 illustrates an exploded view of an input rotation disk and an output rotation disk of FIG. 1. The input rotation disk 106 is coaxially connected with the output rotation disk 108. The output rotation disk 108 has several edge fasteners 108a for holding the input rotation disk 106 thereon. The input rotation disk 106 has a central hole 106b to be connected to an input rotation driving source, e.g., a steering wheel. The output rotation disk 108 also has a central hole 108a to be connected to an output rotation target, e.g., a mechanism for controlling wheels of a vehicle. Two rotary variable resistors 112 are installed on the output rotation disk 108 to serve as a torsion measuring module of the torsion angle and rotation angle measurement device. Each rotary variable resistor 112 is equipped with a torsion measuring arm 110. The torsion measuring arm 110 is pivotally connected with a pivot hole 112a of the rotary variable resistor 112 at an end 110b, and is slidably connected with a linear slot 106a of the input rotation disk 106 at an opposite end.

Figure 5:
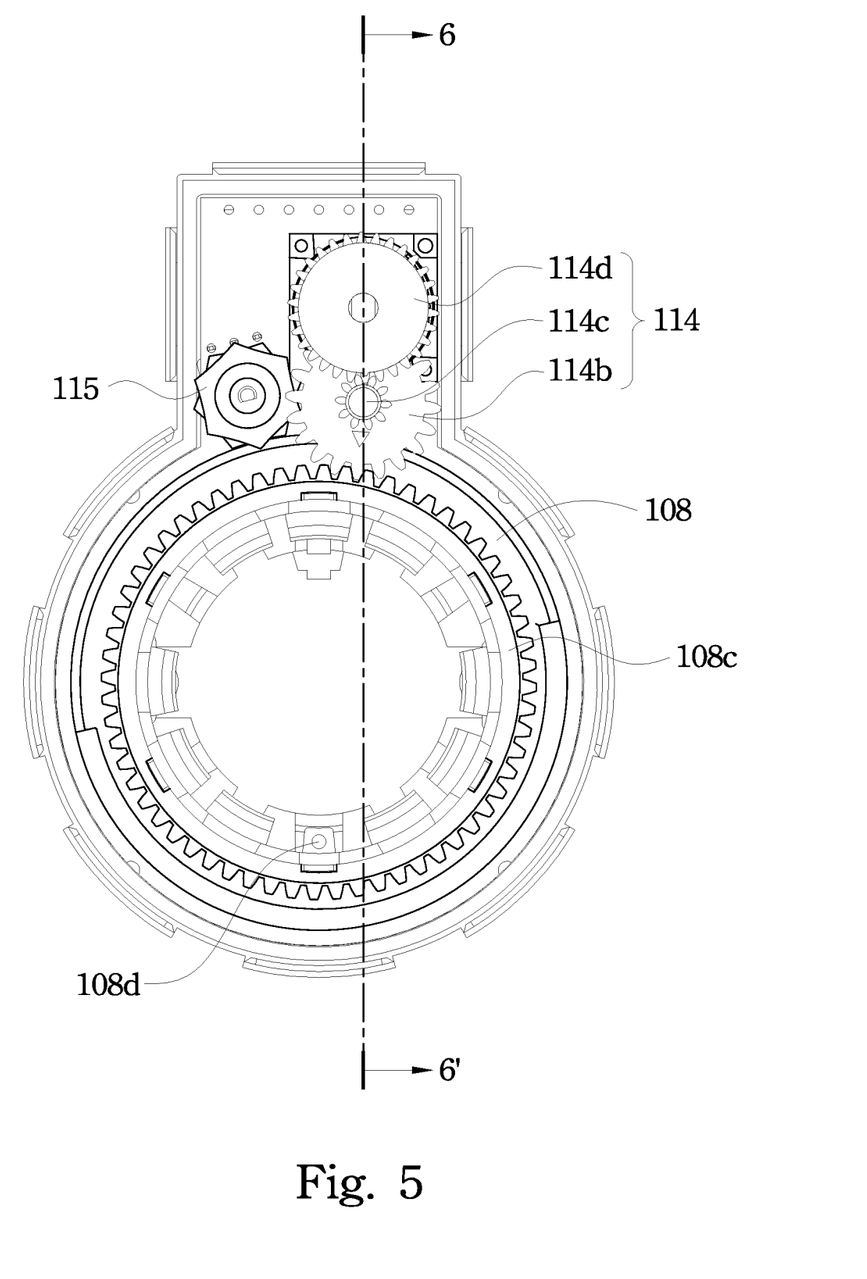
FIG. 5 illustrates a bottom view of the torsion angle and rotation angle measurement device in FIG. 1 with its second housing removed.
Figure 6:
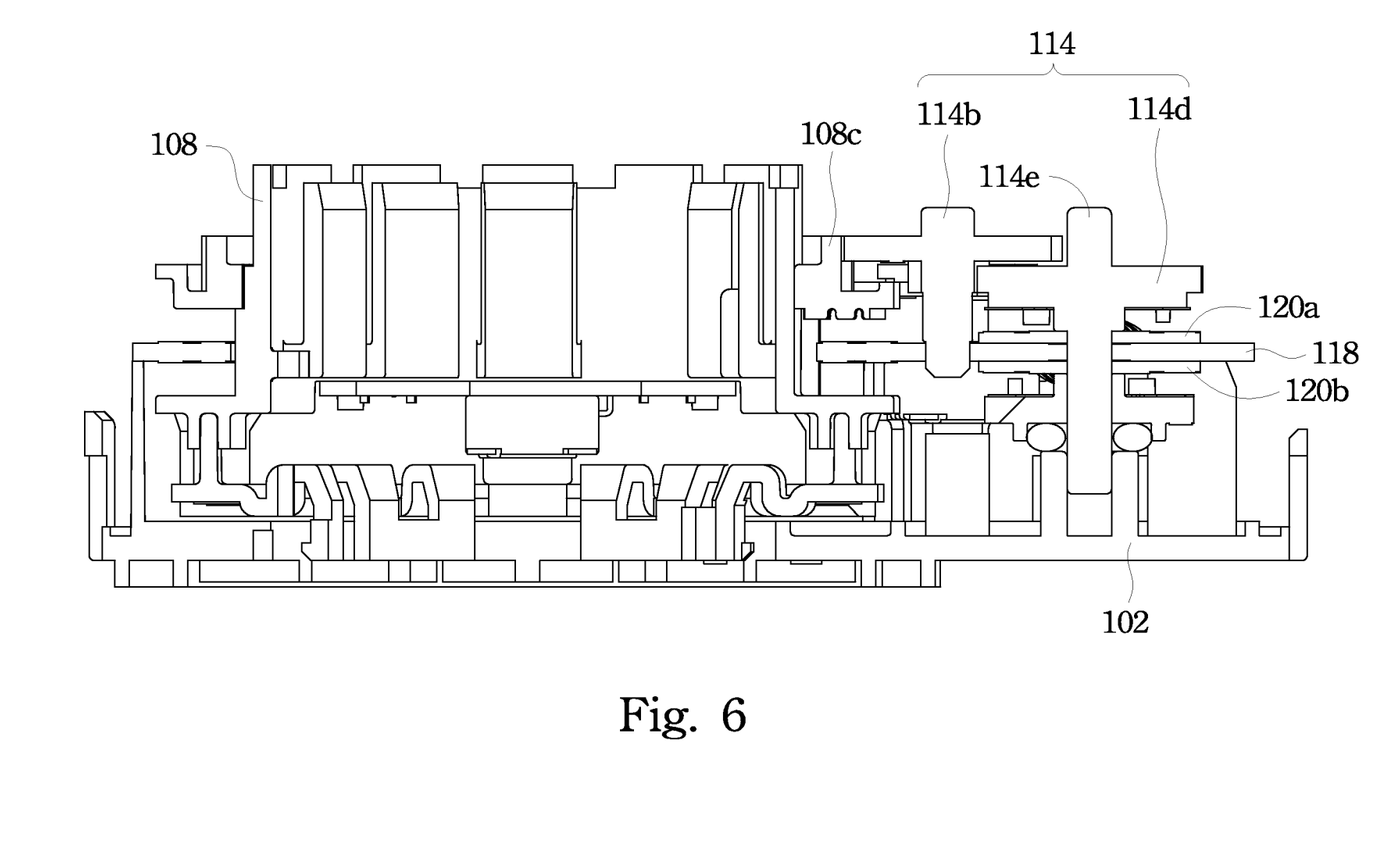
FIG. 6 illustrates a cross-sectional view taken along a cross-section line 6-6' in FIG. 5.

FIG. 5 illustrates a bottom view of the torsion angle and rotation angle measurement device in FIG. 1 with its second housing removed, and FIG. 6 illustrates a cross-sectional view taken along a cross-section line 6-6' in FIG. 5. These two figures depict detailed structures of the rotation measuring module of the torsion angle and rotation angle measurement device. The rotation measuring module includes a printed circuit board 118, two rotary variable resistors (120a; 120b) and a gear wheel set 114. Two rotary variable resistors (120a; 120b) are coaxially installed on two opposite sides of the printed circuit board 118. When the two rotary variable resistors (120a; 120b) operate, only one of the two rotary variable resistors (120a; 120b) outputs its measured value to trigger the power steering action, and either one of the two rotary variable resistors (120a; 120b) serves as a fail-safe on behalf for the other one. Two rotary variable resistors (120a; 120b) measures a rotation angle of the output rotation disk 108 by its gear wheel. The output rotation disk 108 has a first gear wheel 108c, and the first gear wheel 108c coaxially rotates with the output rotation disk 108 simultaneously. The gear wheel set 114 includes a second gear wheel 114b, a third gear wheel 114c and a fourth gear wheel 114d. The second gear wheel 114b is meshed with the first gear wheel 108c. Therefore, when the output rotation disk 108 rotates, the second gear wheel 114b rotates simultaneously. The third gear wheel 114c and second gear wheel 114b are coaxially connected and rotate simultaneously. The third gear wheel 114c is meshed with the fourth gear wheel 114d, and a rotary shaft 114e of the fourth gear wheel 114d coaxially drives the two rotary variable resistors (120a; 120b). In this embodiment, the first gear wheel 108c and the second gear wheel 114b have a teeth ratio of 4:1, and the third gear wheel 114c and the fourth gear wheel 114d have a teeth ratio of 1:4. Therefore, the output rotation disk 108 can drive the fourth gear wheel 114d to equally rotate, and the two rotary variable resistors (120a; 120b) are able to measure correct rotation angles of the output rotation disk 108.

Furthermore, the second gear wheel 114b also drives another gear wheel 115 and its rotary variable resistor. When the output rotation disk 108 rotates for more than 360 degrees, the gear wheel 115 counts and adds 360 degrees, and thereby a correct rotation angle of the output rotation disk 108 can be measured. In this embodiment, two rotary variable resistors (120a; 120b) are coaxially installed on two opposite sides of the printed circuit board 118 so as to reduce the size of the printed circuit board needed to install two rotary variable resistor (120a; 120b) thereon. Therefore, the torsion angle and rotation angle measurement device's size can be more compact and be used in a smaller application environment.

Figure 7:
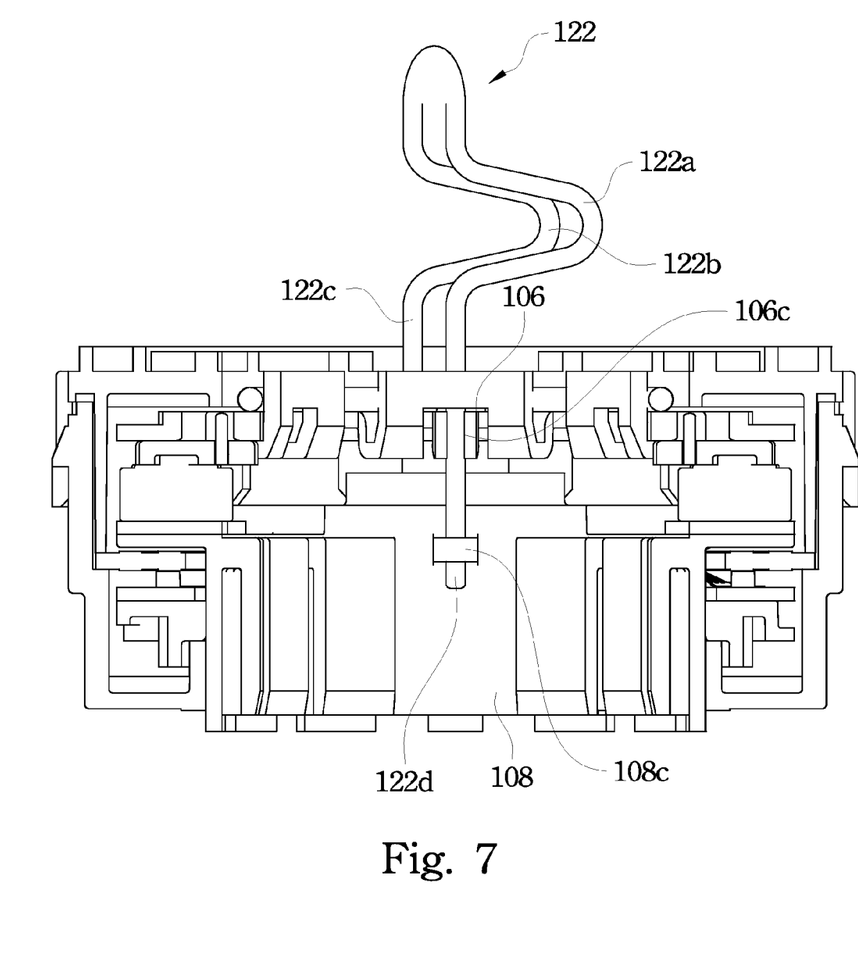
FIG. 7 illustrates a side view of the torsion angle and rotation angle measurement device in FIG. 1 with a positioning pin inserted.

Referring to FIG. 7, which illustrates a side view of the torsion angle and rotation angle measurement device in FIG. 1 with a positioning pin inserted. The positioning pin 122 is used to set an initial position for measuring a rotation angle and torsion angle. When the torsion angle and rotation angle measurement device is installed in a device, e.g., a power steering wheel, no calibration action is needed after the positioning pin is removed. The positioning pin 122 has two ends (122c; 122d), and the end 122d is used to insert a positioning hole 106c of the input rotation disk 106 (referring to FIG. 3) and a positioning hole 108d of the output rotation disk 108 (referring to FIG. 5) without penetrating any portion of the printed circuit board. Another end 122c of the positioning pin 122 is fastened to the first housing 102 or the second housing 104. In addition, the positioning pin 122 further includes a pair of handle portions (122a; 122b) to be pressed by two fingers, e.g., a thumb and an index finger, so as to remove the end 122c of the positioning pin 122 from the first housing 102 or the second housing 104 and then remove the remaining end 122d of the positioning pin 122. In this embodiment, the pair of handle portions (122a; 122b) is a pair of V-shaped members.

Figure 8:
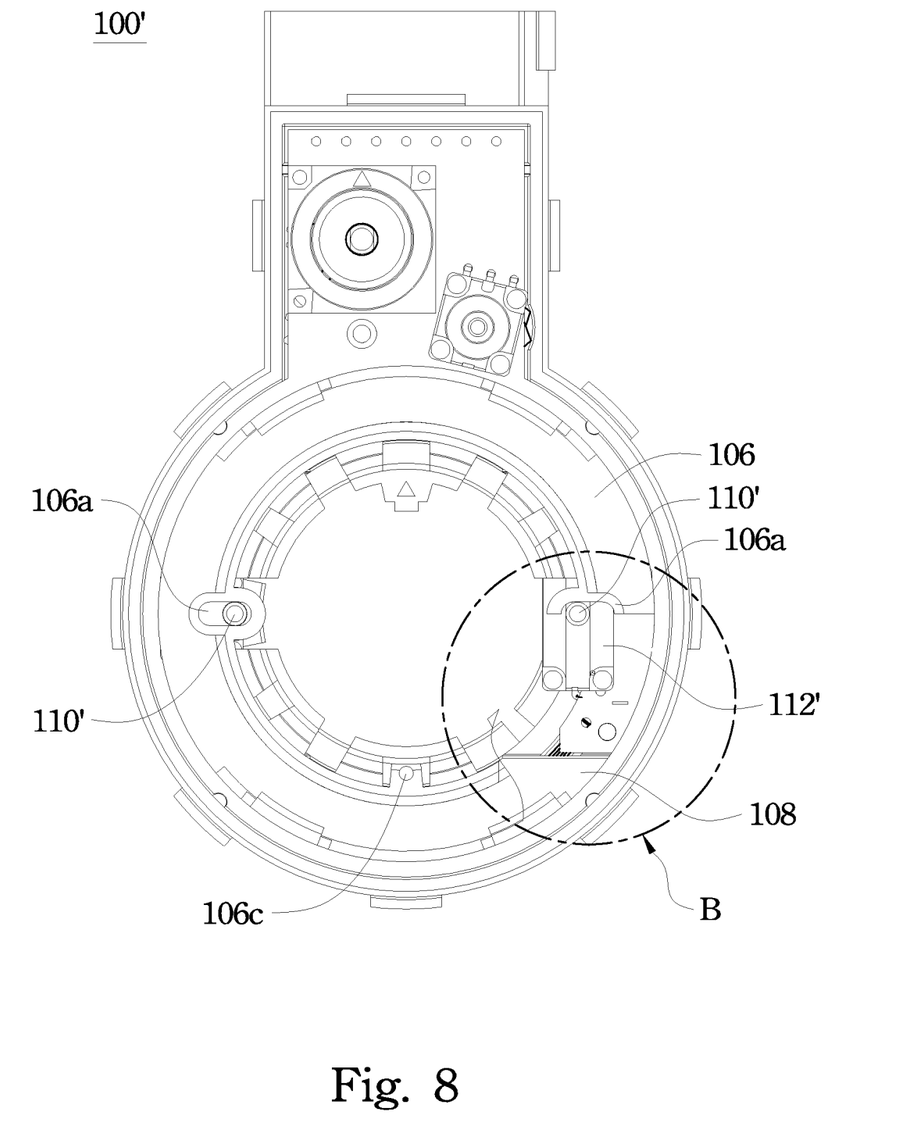
FIG. 8 illustrates a bottom view of a torsion angle and rotation angle measurement device 100' with its second housing removed according to another embodiment of this invention.

Referring to FIG. 8, which illustrates a bottom view of a torsion angle and rotation angle measurement device 100' with its second housing removed according to another embodiment of this invention. This embodiment is different from the embodiment in FIG. 3 in a variable resistor type. A linear variable resistor 112' is used in this embodiment instead of a rotary variable resistor. To clearly illustrate the linear variable resistor 112' and a sliding arm 110', a section B of the input rotation disk 106 is also removed. Two linear variable resistors 112' are installed on the output rotation disk 108, and are located between the input rotation disk 106 and the output rotation disk 108. When the two linear variable resistors 112' operate, only one of the linear variable resistors 112' outputs its measured value to trigger the power steering action, and either one of the two linear variable resistors 112' serves as a fail-safe on behalf for the other one. The input rotation disk 106 includes a linear slot 106a for the sliding arm 110' to slide therewithin. This mechanism converts a rotation action of the input rotation disk 106 into a linear action of the sliding arm 110', thereby reducing vibration interference along a radial direction of the input rotation disk 106 in measuring the torsion angle.

According to the above discussed embodiments, the torsion angle and rotation angle measurement device improves vibration interference along a radial direction of the input rotation disk in measuring the torsion angle, and thus measures a correct torsion angle. In addition, the rotation measuring module has its two rotary variable resistors coaxially installed on two opposite sides of the printed circuit board so as to reduce the size of the printed circuit board needed to install two rotary variable resistors thereon. Therefore, the torsion angle and rotation angle measurement device's size can be more compact and be used in a smaller application environment.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A torsion angle and rotation angle measurement device comprising:
    an input rotation disk being connected with an input rotation driving source;
    an output rotation disk being connected with an output rotation target, and being coaxially and rotatably connected with the input rotation disk, the output rotation disk having a first gear wheel;
    at least two torsion measuring modules being disposed between the input rotation disk and the output rotation disk, each torsion measuring module comprising:
    a rotary variable resistor being disposed on the output rotation disk; and
    a torsion measuring arm being pivotally connected with the rotary variable resistor at an first end thereof and being slidably connected with the input rotation disk at an second opposite end thereof, wherein the rotary variable resistor measures an angle indicating the input rotation disk rotating relative to the output rotation disk when the input rotation disk rotates relative to the output rotation disk; and a rotation measuring module comprising:

a printed circuit board;

two rotary variable resistors being coaxially disposed on two opposite sides of the printed circuit board; and a gear wheel set being meshed with the first gear wheel and coaxially driving the two rotary variable resistors simultaneously, wherein the two rotary variable resistors measure a rotation angle of the output rotation disk when the output rotation disk rotates.

2. The torsion angle and rotation angle measurement device of claim 1, wherein the input rotation disk has a linear slot for the torsion measuring arm to slide therewithin.

3. The torsion angle and rotation angle measurement device of claim 1, further comprising a first housing and a second housing, wherein the first housing and the second housing are assembled to enclose the input rotation disk, the output rotation disk, the at least two torsion measuring modules and the rotation measuring module.

4. The torsion angle and rotation angle measurement device of claim 3, further comprising a positioning pin to align the input rotation disk with the output rotation disk, wherein the positioning pin is inserted into respective positioning holes of the input rotation disk and the output rotation disk at a first end thereof, and is connected with the first housing or the second housing at a second opposite end.

5. The torsion angle and rotation angle measurement device of claim 1, wherein the gear wheel set comprises a second gear wheel, a third gear wheel and a fourth gear wheel, wherein the second gear wheel is meshed with the first gear wheel, and the third gear wheel is coaxially connected with the second gear wheel and rotates simultaneously, and the third gear wheel is meshed with the fourth gear wheel, and the fourth gear wheel coaxially drives the two rotary variable resistors.

6. A torsion angle and rotation angle measurement device, comprising:

an input rotation disk being connected with an input rotation driving source;

an output rotation disk being connected with an output rotation target, and being coaxially and rotatably connected with the input rotation disk, the output rotation disk having a first gear wheel;

at least two torsion measuring modules being disposed between the input rotation disk and the output rotation disk, each torsion measuring module comprising at least one linear variable resistor, the linear variable resistor being disposed on the output rotation disk and having a sliding arm connected with the input rotation disk, wherein the linear variable resistor measures an angle indicating the input rotation disk rotating relative to the output rotation disk when the input rotation disk rotates relative to the output rotation disk;

a rotation measuring module comprising:

a printed circuit board;

two rotary variable resistors being coaxially disposed on two opposite sides of the printed circuit board; and a gear wheel set being meshed with the first gear wheel and coaxially driving the two rotary variable resistors simultaneously, wherein the two rotary variable resistors measure a rotation angle of the output rotation disk when the output rotation disk rotates.

7. The torsion angle and rotation angle measurement device of claim 6, wherein the input rotation disk has a linear slot for the torsion measuring arm to slide therewithin.

8. The torsion angle and rotation angle measurement device of claim 6, further comprising a first housing and a second housing, wherein the first housing and the second housing are assembled to enclose the input rotation disk, the output rotation disk, the at least two torsion measuring modules and the rotation measuring module.

9. The torsion angle and rotation angle measurement device of claim 8, further comprising a positioning pin to align the input rotation disk with the output rotation disk, wherein the positioning pin is inserted into respective positioning holes of the input rotation disk and the output rotation disk at a first end thereof, and is connected with the first housing or the second housing at a second opposite end.

10. The torsion angle and rotation angle measurement device of claim 6, wherein the gear wheel set comprises a second gear wheel, a third gear wheel and a fourth gear wheel, wherein the second gear wheel is meshed with the first gear wheel, and the third gear wheel is coaxially connected with the second gear wheel and rotates simultaneously with the second gear wheel, and the third gear wheel is meshed with the fourth gear wheel, and the fourth gear wheel coaxially drives the two rotary variable resistors.

\* \* \* \* \*